United States Patent [19]

Moore et al.

[11] 4,106,588
[45] Aug. 15, 1978

[54] MODE CANCELING COMPOSITE PANEL FOR GREATER THAN MASS-LAW TRANSMISSION LOSS IN THE PRINCIPAL SPEECH BANDS

[75] Inventors: James A. Moore, Cambridge; Richard H. Lyon, Belmont, both of Mass.

[73] Assignee: Massachusetts Institute of Technology, Cambridge, Mass.

[21] Appl. No.: 709,822

[22] Filed: Jul. 29, 1976

[51] Int. Cl.² .......................... E04B 1/99; G10K 11/04
[52] U.S. Cl. ..................................... 181/284; 181/286; 181/291; 181/294
[58] Field of Search ............... 181/33 G, 33 GA, 284, 181/286, 290, 291, 294

[56] References Cited

U.S. PATENT DOCUMENTS

| 2,744,044 | 5/1956 | Toulmin, Jr. | 181/33 G |
| 3,041,219 | 6/1962 | Steck | 181/33 G |
| 3,124,639 | 3/1964 | Kahn | 181/33 G |
| 3,274,046 | 9/1966 | Shannon et al. | 181/33 G |
| 3,822,764 | 7/1974 | Val | 181/33 G |
| 3,960,236 | 6/1976 | Holmes | 181/33 G |
| 3,985,198 | 10/1976 | Kurtze et al. | 181/33 G |

Primary Examiner—Stephen J. Tomsky
Attorney, Agent, or Firm—Arthur A. Smith, Jr.; Martin M. Santa

[57] ABSTRACT

A composite panel is described in which the face sheets and the core have properties such that the panel produces a double wall resonance near the low frequency end of the principal speech bands and in which the panel produces interaction between the symmetric and antisymmetric mode in the principal speech bands, thereby providing greater than mass-law transmission loss over a substantial portion of the audio frequency spectrum. At frequencies above the principal speech bands effects are determined primarily by the properties of the individual face sheets.

1 Claim, 8 Drawing Figures

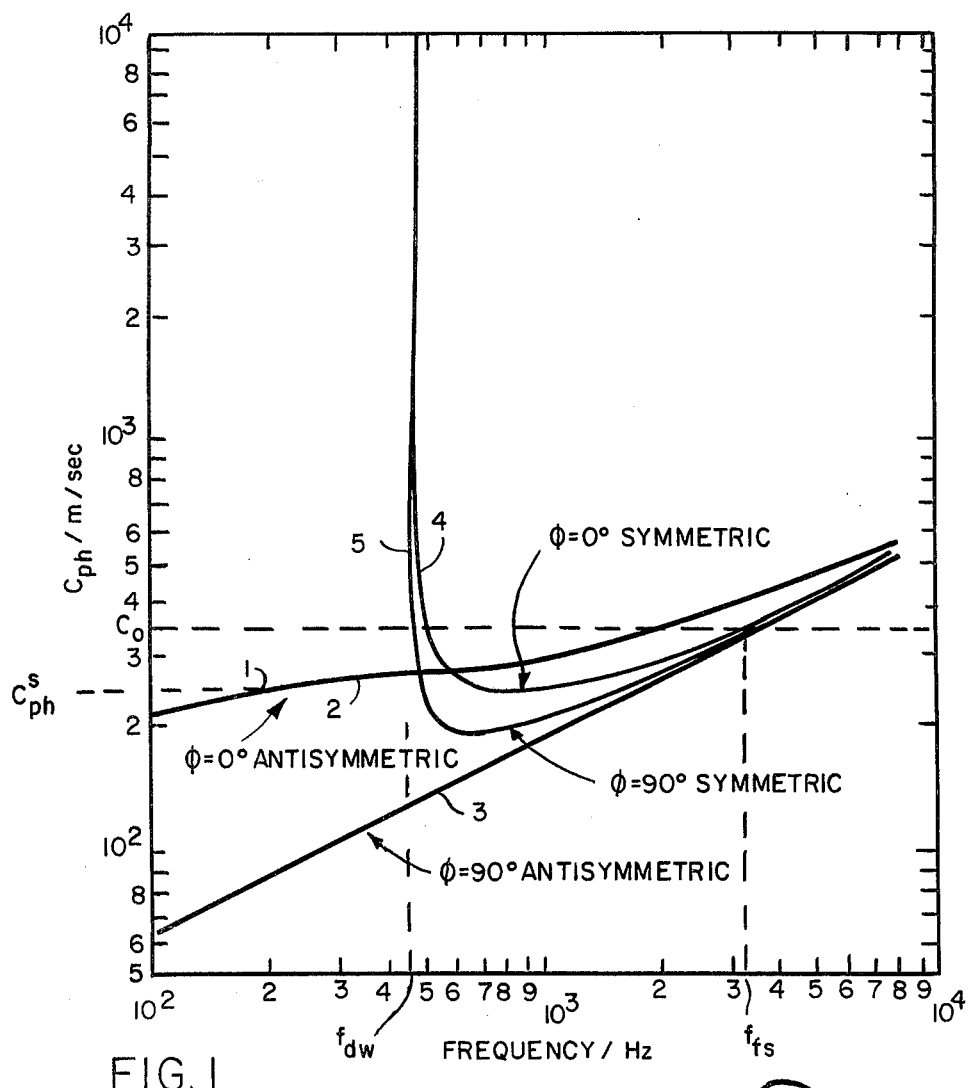
FIG. I
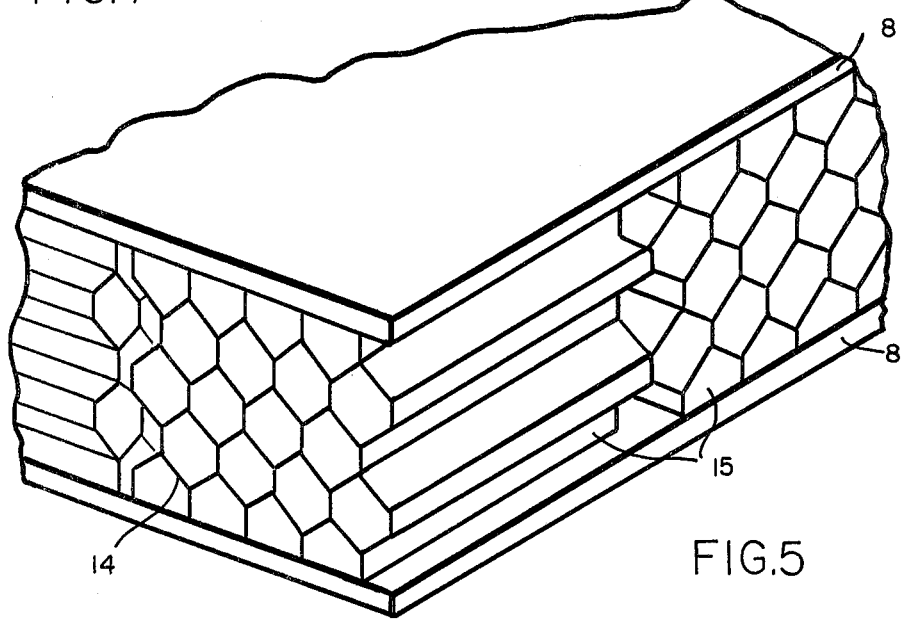
FIG. 5

MODE CANCELING COMPOSITE PANEL FOR GREATER THAN MASS-LAW TRANSMISSION LOSS IN THE PRINCIPAL SPEECH BANDS

The Government has rights in this invention pursuant to Grant No. K-38424 and IPA-0010 awarded by the National Science Foundation.

BACKGROUND OF THE INVENTION

This invention relates to panels or wall modules of composite or sandwich construction that have good sound insulation properties while retaining the advantages of an integral construction provided by the sandwich configuration; more particularly, the invention relates to a panel having higher than mass-law transmission loss over a portion of the audio frequency band.

There are many prior-art designs for modular composite wall constructions. Four of these designs are described here. Each of these panel designs has disadvantages that affect its acoustical or structural performance, as well as its cost, and that limit its usefulness.

In these applications, transverse displacements of the face sheets are 180° out of phase for symmetric motions, while for antisymmetric motions the transverse displacements of the face sheets are in phase.

(a) Styrofoam core construction: The panel consists of a fairly rigid foam such as styrofoam sandwiched between two face sheets of plywood, pressboard, gypsum board, aluminum or steel sheets or of similar materials. This construction has a severe "double wall" of symmetric mode resonance in the principal speech bands leading to a very low "STC" rating for sound insulation. Although acceptable structurally, the acoustical performance of this construction is poor.

(b) Honeycomb core construction: The configuration is similar to that described above except that the core is a resin impregnated paper or aluminum honeycomb with the axis of the honeycomb cells oriented perpendicular to the face sheets. The face sheets may be made of material indicated in (a). Other materials may be used for the core. The phase speed for the antisymmetric mode is supersonic in the principal speech bands as a result of the large shear modulus of the core. The panel damping is small and insufficient to achieve a satisfactory acoustical performance. This design is similar to the "coincidence wall" design except that the phase speed for antisymmetric motions is not large enough (the shear modulus not large enough) and the panel damping is insufficient. The panel is structurally acceptable, but its acoustic performance is poor.

(c) The "Soundshear" or "Shear Wall" design: The shear modulus of the core material is controlled so that the phase speed or speed of propagation for antisymmetric transverse motions of the face sheets is subsonic through the principal speech bands. The compressive stiffness of the core material perpendicular to the face sheets is large so that the double wall resonance occurs at as high a frequency as possible.

The "shear wall" design can provide a reasonable acoustic performance for a sandwich panel design. The transmission loss is limited by limp wall mass law transmission loss in the principal speech bands. However, the core configuration required for the combination of high compressive stiffness in the thickness direction and controlled low shear modulus for shearing motions of one face sheet parallel to the other tends to be somewhat expensive to construct and requires materials that are somewhat costly by building construction standards.

(d) The "Coincidence Wall" design: The shear modulus of the core material is controlled to be large so that the antisymmetric mode of propagation is supersonic throughout the principal speech bands. The antisymmetric mode of vibration, which may be resonantly excited by incident acoustic energy, is heavily damped through the proper choice of the core material or the addition of damping layers to the core. The transmission loss (TL) for this design is strongly dependent on the panel damping. The compressive stiffness of the core is as high as possible as it is for the shear wall design.

The "Coincidence Wall" design requires high shear and compressive stiffness as well as high damping for the core layer(s). This design, which exists at present only in experimental configurations, has been scarcely able to reach limp wall mass law TL and would appear to be quite expensive to produce.

For typical "Shear Wall" and "Coincidence Wall" constructions, the phase speed for the antisymmetric mode of propagation in the principal speech bands is strongly dependent on the shear modulus of the core. For the "Shear Wall" the shear stiffness of the core is controlled so that the antisymmetric mode is subsonic until high frequencies above the principal speech bands. The acoustic performance is mass law limited. For the "Coincidence Wall" the shear stiffness of the core is large so that the antisymmetric mode is supersonic at low frequency. The phase speed of this mode is substantially greater than the speed of sound in the principal speech bands. The coincidence effects (tendency towards low TL) in the principal speech bands are overcome through use of a heavily damped core material or additional heavily damped core layers. The TL can, in principle, exceed mass law TL if the wall is appropriately designed to take advantage of the added damping.

SUMMARY OF THE INVENTION

The new panel design of this invention involves consideration of the behavior of both the symmetric and antisymmetric modes of propagation in the panel. The "Shear Wall" and "Coincidence Wall" designs consider only the behavior of the antisymmetric mode of vibration in that the compressive stiffness of the core is specified to be as large as possible so that resonant symmetric motions first occur at high frequencies. The acoustic performance is dependent upon the phase speed for propagation of the antisymmetric mode in the panel. For frequencies where the antisymmetric mode is supersonic, coincidence effects exist which are characterized by high transmission of sound through the panel (low TL). The degree of transmission is controlled by the level of internal damping in the panel. When the antisymmetric mode is subsonic, the acoustic performance of the panel is limp wall mass law limited.

For the panel design of this invention, the double wall or symmetric mode resonance is moved below the principal speech bands by using a core material which is relatively soft in compression in the thickness direction. The behavior of the anti-symmetric mode is controlled to be subsonic in the principal speech bands much in the same manner as with the "Shear Wall." The transmission loss in the principal speech bands exceeds mass law TL as a result of an interaction between the symmetric and antisymmetric modes, which will be described in more detail further on. These are the distinguishing characteristics associated with the new panel designs: (1) the low frequency double wall resonance, and (2) the interaction between the antisymmetric and symmetric modes in the principal speech bands.

It is a primary object of this invention to provide a composite panel which has greater than mass-law transmission loss over a substantial portion of the audio frequency spectrum.

It is a further object of this invention to provide a prefabricated light-weight panel which has a transmission loss equal to that of heavier panels of prior art designs.

It is a further object of this invention to provide an inexpensive prefabricated panel made from readily available inexpensive building materials.

It is a further object of this invention to provide a prefabricated panel of typical panel size having structural rigidity of its own provided by the shear stiffness of the core material. While the invention does not allow the shear stiffness to be exceedingly high, the shear stiffness is as high as possible without degrading acoustic performance and the panel provides sufficient static restraining force to pushing.

It is a feature of this panel that it does not contain framing or studding or the like thereby making it relatively uniform over its entire area.

It is a further feature than the panel can be cut by a bandsaw or a tablesaw to fit into a particular odd-shaped area without adversely affecting its performance.

IN THE FIGURES

FIG. 1 shows the phase speed of the symmetric and anti-symmetric modes in a representative panel of this invention.

FIGS. 5–8 show alternate embodiments of the panel of this invention.

DESCRIPTION OF THE INVENTION

Figure 2:
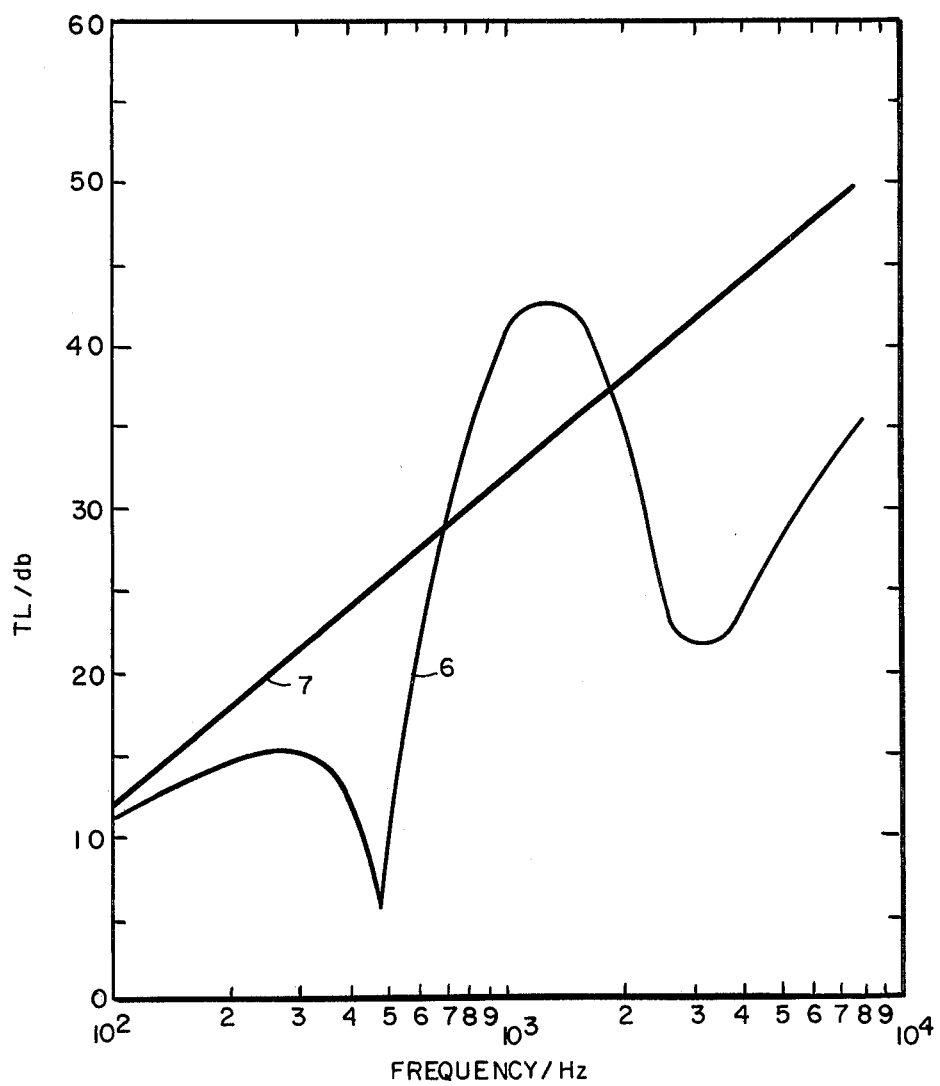
FIG. 2 shows the calculated transmission loss for the panel of FIG. 1 in comparison to mass law transmission loss.

The panel design of this invention provides composite panels acoustically characterized by a low frequency double wall resonance; greater than mass law transmission loss in the principle speech bands as a result of the interaction between the symmetric and antisymmetric modes of vibration, and coincidence effects for both modes at high frequencies above the principle speech bands that are determined primarily by the properties of the face sheets.

Analytically predicted phase speeds for the propagation of both symmetric and antisymmetric modes in the composite panel of one embodiment of the invention are shown in FIG. 1. The core material for this composite panel is anisotropic and similar to the honeycomb material of FIG. 3. Its stiffness moduli are different depending on the orientation with respect to principle axes of the material. The phase speeds will depend on the direction of propagation in the composite as a result of the variation with direction of the elastic properties of the core. The indicated orientations, $\phi = 0°, 90°$ represent propagation in the in-plane principle axis directions. The third principle axis for this particular design is oriented perpendicular to the face sheets.

For very low frequencies, resonant symmetric mode, motions do not occur, because the compressive stiffness of the core material dominates. As frequency is increased a symmetric mode double wall resonance occurs (at frequency $f_{dw}$). The double wall resonance frequency is given by:

$$f_{dw} = \frac{1}{2\pi} \left( \frac{\frac{2E_{11}}{L}}{(\rho_{fs} + \frac{1}{6}\rho_c L)} \right)^{\frac{1}{2}}$$

where L is the thickness of the core (m), $\rho_{fs}$ is the surface mass density of one face sheet (Kg/m$^2$), $\rho_c$ is the density of the core material (Kg/m$^3$). $E_{11}$ is the elastic compressive stiffness of the core material in the direction perpendicular to the face sheets. For an isotropic material $E_{11} = \lambda + \mu$ where $\lambda$ and $\mu$ are the Lamé constants. $E_{11}$ and $\rho_{fs}$ are the dominant parameters for the determination of $f_{dw}$.

As frequency is increased (above $f_{dw}$) the symmetric mode phase speed decreases becoming subsonic until high frequencies where the phase speed is principally determined by the properties of the face sheets. The frequency $f_{fs}$ (to be considered later) must be sufficiently high relative to $f_{dw}$ so that the symmetric mode phase speed goes below $c_o$ over the band of frequencies to be attenuated. Curves 4 and 5 show the symmetric mode phase speed as a function of frequency.

The phase speed for the antisymmetric mode at low frequencies is determined by bending motions of the composite and is given by:

$$c_{ph} = \left( \frac{D}{\rho_{fs} + \frac{1}{2}\rho_c L} \right)^{\frac{1}{4}} \sqrt{\omega} \quad \text{where } D = \frac{E t_p (L + t_p)^2}{4(1 - \nu^2)}$$

and where E is Young's modulus, $\nu$ is Poisson's ratio and $t_p$ is the thickness, all for a face sheet. $\Omega$ is the radian frequency. In the mid-frequency region the phase speed is more nearly constant with frequency, being determined by the shear stiffness of the core. The phase speed of the antisymmetric mode passes through a value determined by the shear stiffness of the core associated with parallel transverse shearing motions of the face sheets:

$$c_{ph}^s = \left( \frac{GL}{2(\rho_{fs} + \frac{1}{2}\rho_c L)} \right)^{\frac{1}{2}}$$

where G is the appropriate shear stiffness for the core. The transition between the low-frequency behavior and the mid-frequency behavior is determined by $c_{ph}^s$. For $\phi = 0°$, the shear stiffness (and $c_{ph}^s$) are large enough for the transition to be seen at point 1 of curve 2 at low frequencies. For $\phi = 90°$ antisymmetric mode the shear stiffness is quite small and the low and mid frequency behaviors are not seen on curve 3 of FIG. 1. All that is seen on curve 3 is the high frequency behavior which is determined by bending in the face sheets according to the following expression:

$$c_{ph} = \left(\frac{D'}{(\rho_{fs} + \frac{1}{6}\rho_c L)}\right)^{\frac{1}{4}} \sqrt{\omega} \text{ where } D' = \frac{Et_p^3}{12(1-\nu^2)}$$

A coincidence frequency, $f_{fs}$, can be determined from the preceding equation when $c_{ph} = c_o$, the speed of sound, according to:

$$f_{fs} = \frac{c_o^2}{2\pi}\left\{\frac{(\rho_{fs} + \frac{1}{6}\rho_c L)}{D'}\right\}^{\frac{1}{2}}$$

For the panel design of FIG. 1 the parameters are chosen so that the phase speeds for both the symmetric and antisymmetric modes of propagation and for all orientations $\phi$ are subsonic below the frequency region near $f_{fs}$.

The principal features of the design with respect to its acoustic performance relate to the phase speeds for the symmetric and antisymmetric modes and the frequencies $f_{dw}$ and $f_{fs}$. These frequencies delineate a region within which both modes of vibration are subsonic. Acoustic energy incident on the composite panel at an angle where its trace wavespeed matches the phase speed of either mode of vibration is readily transmitted through the composite panel. For the design process, the frequencies $f_{dw}$ and $f_{fs}$ are positioned to be below and above the principal speech bands, respectively. In the principal speech bands both symmetric and antisymmetric modes are subsonic. For frequencies higher than the highest frequency of the acoustic band to be attenuated, $\geq f_{fs}$, the symmetric and antisymmetric modes exhibit a coincidence that is primarily determined by the properties of the face sheet.

Figure 3:
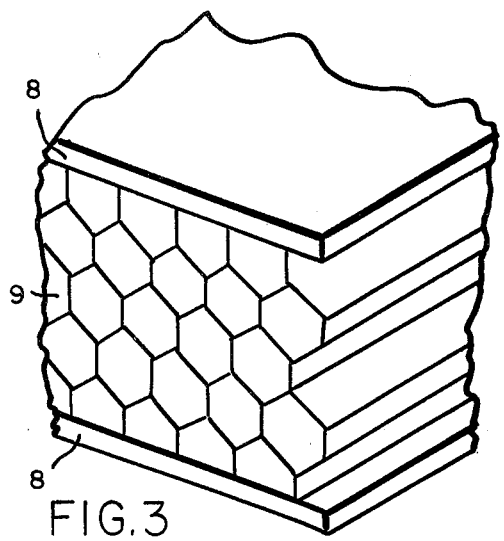
FIG. 3 shows an embodiment of a panel of this invention having the cell axis of the honeycomb core parallel to the face sheets.

The embodiment of FIG. 1 consists of ¼ inch common exterior grade plywood face sheets and a honeycomb core material similar to the core material of FIG. 3. Representative values for the important parameters of the core material were; for the compressive stiffness:

$$E_{11} = 1.3 \times 10^6 \text{ N/m}^2,$$

for the shear stiffnessess, corresponding to the 0° and 90° in-plane orientations:

$$G_o = 7.7 \times 10^6 \text{ N/m}^2,$$

$$G_{90} = 6.7 \times 10^4 \text{ N/m}^2,$$

the core thickness $L = 0.076$m, and the core density $\rho_c = 20$ Kg/m$^3$. For a plywood face sheet:

$$E = 7.0 \times 10^9 \text{ N/m}^2,$$

$$\rho_{fs} = 4 \text{ Kg/m}^2$$

and $$t_p = 0.00635\text{m}.$$

Using these values the predicted transmission loss for the design is shown in FIG. 2 as curve 6 and shows the coincidence efforts, in the form of reduced transmission loss in the regions delineated by the frequencies $f_{dw}$ and $f_{fs}$. For frequencies between $f_{dw}$ and $f_{fs}$ the transmission loss is large, exceeding field incidence mass law transmission loss by as much as 10 dB for this particular design. Were only the antisymmetric mode present in this frequency region (as is the case for the "shear wall" design) the transmission loss would be limited by field incidence mass law transmission loss, curve 7 of FIG. 2, as antisymmetric motions would be mass controlled. The transmission loss exceeds mass law transmission loss due to interactions between the symmetric and antisymmetric modes, both of which are mass controlled. Both modes respond with similar phase on the side of the composite panel on which the acoustic energy is incident. Thus the transverse motions of both modes will have similar phase for this face sheet. However, the transverse motions of the symmetric and antisymmetric modes for the opposite face sheet will be nearly 180° out of phase as a result of the definition of symmetric and antisymmetric motions. The transverse motion of the opposite face sheet, which is the sum of symmetric and antisymmetric motions, will be reduced as a result of the out of phase addition (the cancellation) of the symmetric and antisymmetric motions. The motion for each mode separately is mass controlled, and as a result of the out of phase addition, the motion of the opposite face sheet is less than that which would result from the mass controlled antisymmetric mode alone.

The surface static load bearing capacity of the panel is principally dependent upon the larger of the in-plane shear stiffnesses of the anisotropic core material. The static deflections of the symmetric mode are significantly less than for the antisymmetric mode for typical size panels (4 by 8 feet, 4 by 12 feet) when supported on edge. The static deflection for antisymmetric mode and, therefore, for the composite panel, is determined by the shear stiffness of the core, as stated above. A limit is placed on the maximum shear stiffness and, therefore, the maximum load bearing capacity of the composite panels to insure that the antisymmetric mode does not become supersonic until high frequencies, above the principal speech bands. Since the phase speed $c_{ph}^s$, is a function of shear stiffness as seen by the preceding equation for $c_{ph}^s$, and since $c_{ph}^s$ must be kept lower than $c_o$, it is seen that the maximum shear stiffness must be so limited.

A 4 by 8 feet composite panel with ⅜ inch thick plywood face sheets 8, and a 3 5/16 inch thick resin impregnated honeycomb core 9, was fabricated as shown in FIG. 3. The values for the parameters of the core material are $E_{11} = 4.0 \times 10^5$ N/m$^2$, $G_0 = 7.6 \times 10^6$ N/m$^2$, $G_{90} = 1.7 \times 10^5$ N/m$^2$, $L = 0.084$m, and $\rho_c = 20.8$ Kg/m$^3$. For the face sheet $\rho_{fs} = 5.68$ Kg/m$^2$, $E = 6.95 \times 10^9$ N/m$^2$ and $t_p = 0.0089$m. The computed values for $f_{dw}$, $f_{fs}$ and $c_{ph}^s$ are:

$f_{dw} = 200$ Hz
$f_{fs} = 2200$ Hz
$c_{ph}^s = 220$ m/sec for the 0° orientation and
$c_{ph}^s = 33$ m/sec for the 90° orientation.

Figure 4:
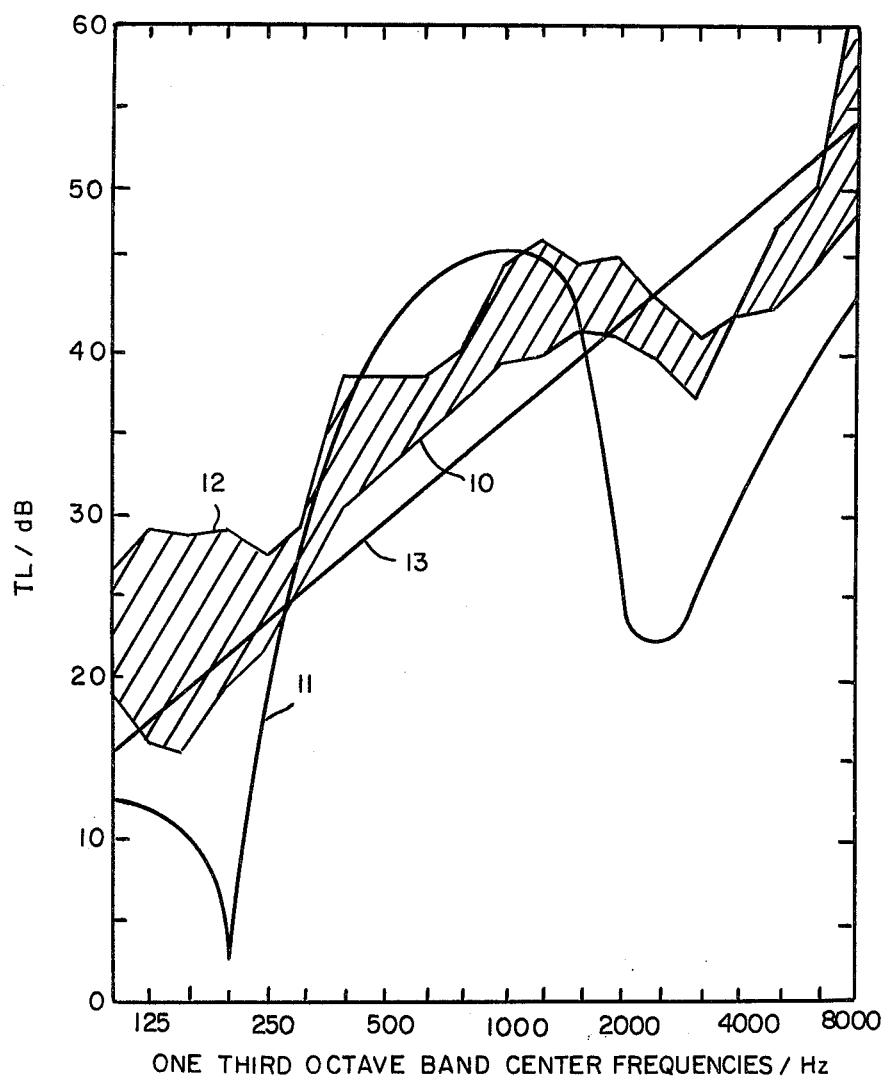
FIG. 4 shows the transmission loss of the panel of FIG. 3.

The experimentally determined curve 10 and analytically predicted curve 11 for transmission loss values for this panel are shown in FIG. 4. The range of experimental values given is the result of uncertainties associated with flanking transmission problems with the sound transmission facility in which the transmission loss measurements were made. The low curve 10 represents the measured transmission loss including flanking transmission and the upper curve 12 has been corrected based on an estimate of the flanking transmission. The symmetric mode or double wall resonance $(f_{dw})$ and the associated coincidence effects occur near 200 Hz and the face sheet controlled coincidence effects $(f_{fs})$ first occur near 2500–3000 Hz. In the region near $f_{fs}$ the coincidence of the face sheets is not as apparent in the experimental data. This discrepancy between theory and experiment represents an, as yet, unexplained behavior that has been observed for other composite panels tested. In the mid-frequency region, in the principal speech bands, the transmission loss exceeds mass law transmission loss, curve 13, by as little as 3 to 4 dB and by as much as 10 dB for the corrected upper curve 12.

OTHER EMBODIMENTS

Any combination of face sheet and core parameters which results in a low frequency double wall resonance (low $f_{dw}$) below the principal speech bands and for which the high frequency supersonic behavior of both the symmetric and antisymmetric modes occur above the principal speech bands will achieve the good acoustical performance of the design. For structural reasons a large shear stiffness of the core for parallel transverse displacements of the face sheets is required. The high shear stiffness may be achieved in both of the two perpendicular in-plane principle axis directions or in only one direction, being soft in shear in the other direction as in the embodiment previously described. The shear stiffness should be large but limited by the acoustial requirement that the phase speed $c_{ph}^s$ for the antisymmetric mode be subsonic. Consequently, there are a number of physical realizations of this concept that will provide the designed function.

The following are designs for materials having a low compressive stiffness and sufficient shear stiffness that satisfy the design requirements for the core material.

FIG. 5 represents a modified honeycomb configuration that has a shear stiffness that is sufficiently, though not excessively large, in both in-plane directions of the panel. The honeycomb material 14 is cut into squares 15 which are oriented with the cell directions pointing at right angles to each other in the plane of the panel. The shear stiffness for both in plane directions achieve an effective value that is average of the soft and stiff values for the honeycomb itself.

For the original and modified honeycomb designs there are two orientations with the cell direction pointing in the plane of the panel that has the desired shear and compressive stiffness properties. The two orientations are described by rotating the honeycomb about the cell direction by 90°. The shear and compressive stiffnesses differ for these orientations, but satisfy the criterion required to achieve the acoustial performance.

Figure 6:
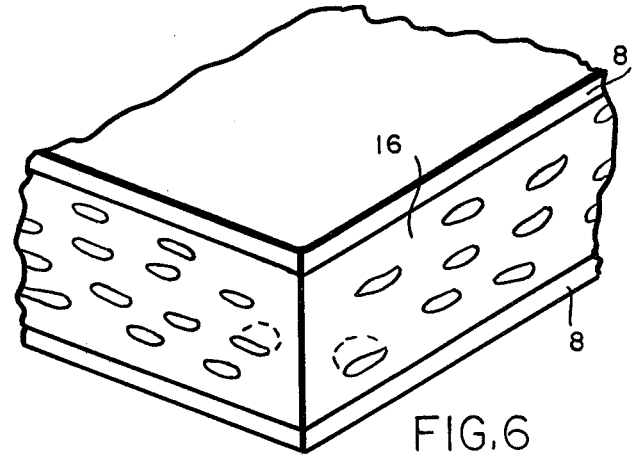

The design of FIG. 6 is a closed cell foamed plastic material where all the cells have been flattened in the same direction. The compressive stiffness in that direction is small due to flexural deformation of the cell walls. The shear stiffness is less affected by the presence of the cells.

Figures 7, 8:
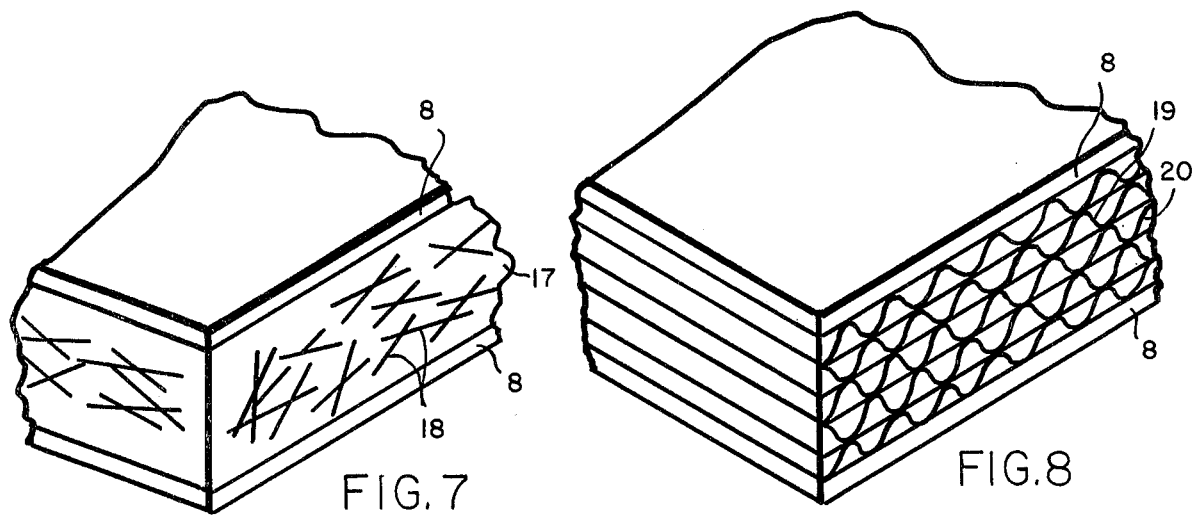

In FIG. 7, a mineral fiber material 17 has been constructed where the fibers 18 describe small angles with respect to the plane of the panel. They point in all directions in the plane of the panel. Where the fibers cross or contact each other, they are bonded together. The low compressive stiffness is the result of flexural deformation of the fibers. The shear stiffness results from the truss like behavior of the bonded fibers. The fibers can be made, as well, from glass, steel or other fibrous material. How the bond is made differs depending on the material.

Another fiber material embodiment for the core consists of fibers embedded in a compressible foamed plastic, such as urethane, where the fibers are oriented to lie largely in the plane of the panel. The shear stiffness of the plastic and fibers is due to the presence of the fibers, as above. The compressive stiffness of the plastic is largely unaffected by the fibers.

A honeycomblike corrugated core 19 structure, shown in FIG. 8, also possesses the desired mechanical properties. The corrugated layers 20 of core 19 can be made relatively thin and the core formed by bonding individual layers one on top of the other. As well, alternating layers could be pointed at right angles to avoid a soft shear direction.

It is evident that those skilled in the art, once given the benefit of foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claim.

What is claimed is:

1. An acoustic panel in a surrounding medium, said panel having greater than mass-law transmission loss in the principal speech band comprising
   a pair of homogeneous face sheets,
   a core completely filling the space between said face sheets and bonded thereto to a form a unitary composite panel,
   a predetermined double wall symmetric mode resonance frequency of the panel delineates the low end of the band of frequencies having greater than mass-law transmission loss, the panel face sheets and core having the following parameters which are selected to provide this predetermined double wall symmetric mode resonance frequency as given by the equation $$f_{dw} = \frac{1}{2\pi} \left( \frac{\frac{2E_{11}}{L}}{(\rho_{fs} + \frac{1}{6}\rho_c L)} \right)^{\frac{1}{2}}$$

where
   L is the thickness of the selected core material,
   $\rho_{fs}$ is the surface mass density of a selected face sheet,
   $\rho_c$ is the density of the core material,
   $E_{11}$ is the elastic compressive stiffness of the core in the direction perpendicular to the face sheets,
   the phase speed of the antisymmetric mode at the transition between the low-frequency behavior of the panel and its high-frequency behavior is given by $$c_{ph}^s = \left( \frac{GL}{2(\rho_{fs} + \frac{1}{2}\rho_c L)} \right)^{\frac{1}{2}}$$

where G is the shear stiffness of the core in the plane of the panel in the direction of highest shear stiffness for said core, where the core is anisotropic,
   the value of $c_{ph}^s$ being subsonic respect to the speed of sound, $c_o$, in the medium surrounding the panel,
   the predetermined upper frequency limit of the band of frequencies having greater than mass-law transmission loss being delineated by:

$$f_{fs} = \frac{c_o^2}{2\pi} \left\{ \frac{(\rho_{fs} + \frac{1}{6}\rho_c L)}{D'} \right\}^{\frac{1}{2}}$$

where $$D' = \frac{E t_p^3}{12(1-\nu^2)}$$

where E = Young's modulus,
$\nu$ = Poisson's ratio,
$t_p$ = thickness, all of the selected face sheet.

* * * * *